United States Patent
Ishii et al.

[11] Patent Number: 5,235,406
[45] Date of Patent: Aug. 10, 1993

[54] OBJECT DISPLACEMENT DETECTION

[75] Inventors: Satoshi Ishii, Tokyo; Tadashi Eguchi, Yokohama, both of Japan

[73] Assignee: Canon Kabushiki Kaisha, Tokyo, Japan

[21] Appl. No.: 717,328

[22] Filed: Jun. 18, 1991

[30] Foreign Application Priority Data

Jun. 20, 1990 [JP] Japan ..... 2-163611
Apr. 25, 1991 [JP] Japan ..... 3-95349

[51] Int. Cl.$^5$ ..... G01B 9/02
[52] U.S. Cl. ..... 356/356; 356/358
[58] Field of Search ..... 356/345, 353, 354, 355, 356/356, 358, 363; 328/15, 16, 17, 20, 21, 23, 24, 28, 30

[56] References Cited

U.S. PATENT DOCUMENTS

| 3,410,976 | 11/1968 | Watson. | |
| 3,626,308 | 12/1971 | Paine | 328/20 |
| 4,676,645 | 6/1987 | Taniguchi et al. | 356/363 |
| 4,700,390 | 10/1987 | Machida | 381/28 |
| 5,067,089 | 11/1991 | Ishii et al. | |

FOREIGN PATENT DOCUMENTS

| 1911583 | 7/1982 | U.S.S.R. |
| A1166265 | 7/1985 | U.S.S.R. |
| A1283807 | 1/1987 | U.S.S.R. |

Primary Examiner—Samuel A. Turner
Attorney, Agent, or Firm—Fitzpatrick, Cella, Harper & Scinto

[57] ABSTRACT

This invention relates to signal processing for enhancing detection resolving power on the basis of a periodic signal obtained in a displacement detecting device such as an encoder or a laser length measuring machine, and on the basis of input sine wave and cosine wave signals which are the references, a sine wave signal and a cosine wave signal of a frequency integer times as high as the frequency of the reference signals are produced by calculation by the use of adders, multipliers, etc.

16 Claims, 7 Drawing Sheets

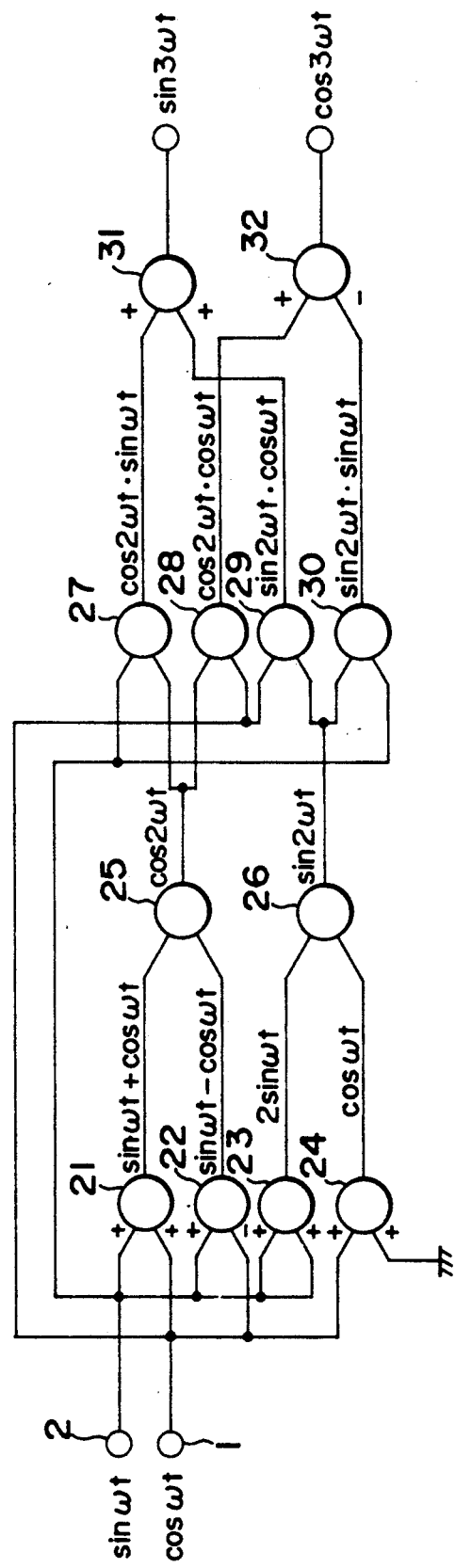
F I G. 5

F I G. 8
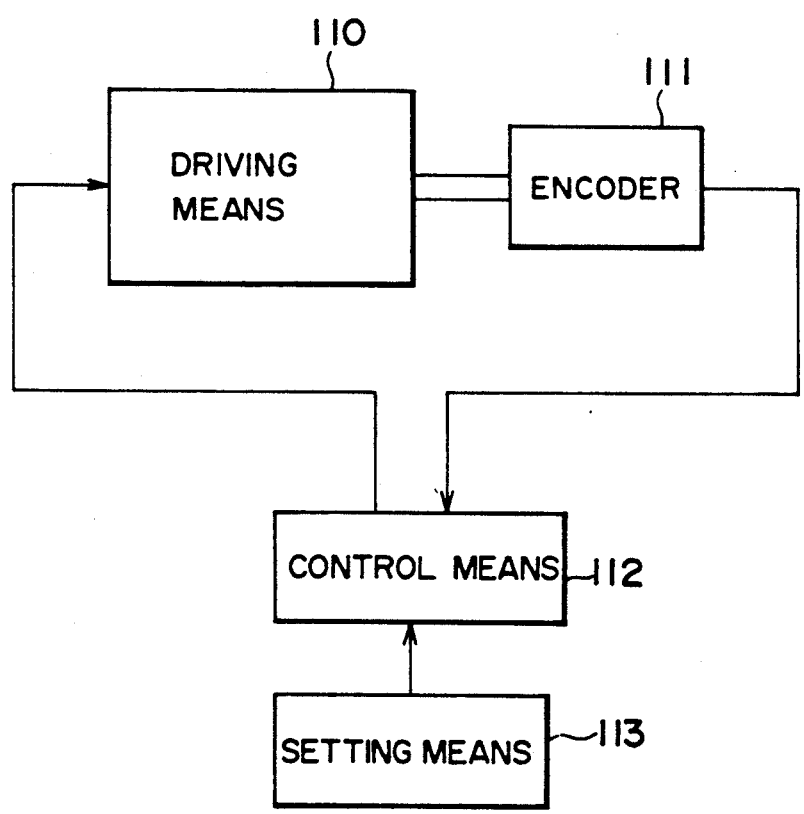

OBJECT DISPLACEMENT DETECTION

BACKGROUND OF THE INVENTION

Field of the Invention

This invention relates to a signal processing technique for enhancing detection resolving power on the basis of a periodic signal obtained in a displacement detecting device such as an encoder or a laser length measuring apparatus.

Related Background Art

In a conventional displacement detecting device, for example, an optical incremental type rotary encoder, sine waves of different phases (two-phase sine wave signals, or in other words, a sine wave and a cosine wave) obtained from two light receiving means are used to detect the amount of rotational displacement and the direction of rotation of a rotating object. In order to more enhance resolving power, it is generally known to make a plurality of divisional pulse signals corresponding to division units from the sine wave signal and the cosine wave signal and utilize them. This is disclosed, for example, in U.S. Pat. No. 3,410,976, U.S. Application Ser. No. 419,705 and U.S. Application Ser. No. 437,634.

FIG. 10 of the accompanying drawings is a block diagram showing an example of signal processing means therein, and waveforms indicated by solid lines in FIG. 11 of the accompanying drawings represent signal waveforms in the various portions of the circuit of FIG. 10. In FIG. 10, the reference numerals 1 and 2 designate input terminals from which a sine wave signal and a cosine wave signal, respectively, are input. That is, in contrast with a signal a (sine wave) from the input terminal 1, a signal b (cosine wave) having a phase difference of 90° is input from the input terminal 2. A signal c endowing the signal a with a phase difference of 180° is obtained in an inverting circuit 3. These three signals are suitably weighted and added by a resistor or the like and a sine wave signal of any angle is interpolated therein. In FIG. 9 of the accompanying drawings, resistors R all are of the same value, and signals d and e having phase differences of 45° and 135°, respectively, are obtained. These signals are converted into rectangular waves by comparators 4, 5, 6 and 7, and a two-phase rectangular wave signal having a phase difference of 90° is provided by a pulse circuit 8. In this manner, a signal of higher resolving power can be obtained from the sine wave signal and cosine wave signal obtained from the light receiving means.

However, in the above-described example of the prior art, there is the merit that any resolving power can be obtained by the weighting resistance value, but the following points become more problematic as an attempt is made to make the resolving power greater:

(1) The greater number of addition resistors results in the necessity of providing many buffers before them;

(2) Interpolation accuracy is aggravated by the influence of the error of the addition resistance value or the irregularity of the input offset of the comparators;

(3) The number of comparators is increased and the scale of the circuit becomes large. For example, an attempt to obtain a two-phase rectangular wave signal of a frequency as high as 64 times the original signal will require 32 comparators; and (4) Considerable accuracy is required of the amplitudes and offsets of and the phase difference between two input signals and adjustment becomes difficult.

SUMMARY OF THE INVENTION

It is an object of the present invention to provide a novel signal processing technique which solves the above-noted problems. More specifically, it is an object of the present invention to provide a novel signal processing technique whereby an apparatus of very high resolving power can be provided without making the scale of the circuit thereof so large, on the basis of a periodic signal obtained in a displacement detecting device such as an encoder or a laser length measuring machine.

It is a further object of the present invention to provide a displacement detecting device and a system to which this signal processing technique is applied.

BRIEF DESCRIPTION OF THE DRAWINGS

FIG. 5 is a block diagram showing another embodiment of the present invention.

FIG. 8 shows the construction of a driving system having the displacement measuring apparatus.

DESCRIPTION OF THE PREFERRED EMBODIMENTS

Embodiment 1

Figure 1:
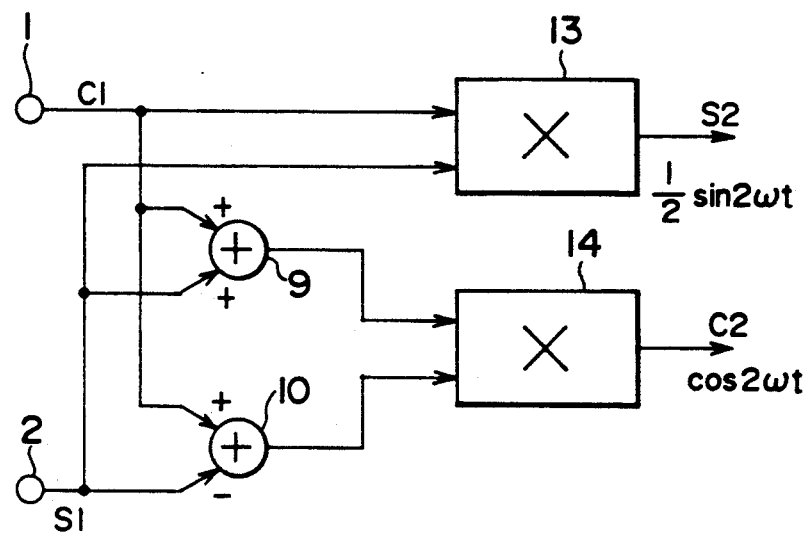
FIG. 1 is a block diagram showing a first embodiment of the present invention.

FIG. 1 is a block diagram for illustrating the basic form of a signal processing circuit suitable for the signal processing of a displacement detecting device such as an encoder or a laser length measuring machine according to the present invention. In FIG. 1, assuming that two signals C and S1 obtained in the displacement detecting device are signals of waveforms expressed as $C1 = \cos\omega t$ and $S1 = \sin \omega t$, the output S2 of a multiplier 13 is $S2 = \cos\omega t \times \sin\omega t = \tfrac{1}{2}\sin 2\omega t.$ Also, the output of an adder 9 is $(\cos\omega t + \sin\omega t)$ and the output of an adder 10 is $(\cos\omega t - \sin\omega t)$ and therefore, the output C2 of a multiplier 14 is $$C2 = (\cos\omega t + \sin\omega t)(\cos\omega t - \sin\omega t)$$
$$= \cos^2\omega t - \sin^2\omega t$$
$$= \cos 2\omega t.$$

A signal 2S2 double the output S2 and the output C2 may be written out as $$C2 = \cos 2\omega t, \quad 2S2 = \sin 2\omega t.$$

This shows that a signal having a frequency twice as high as that of the original two signals which are the references.

Figure 2:
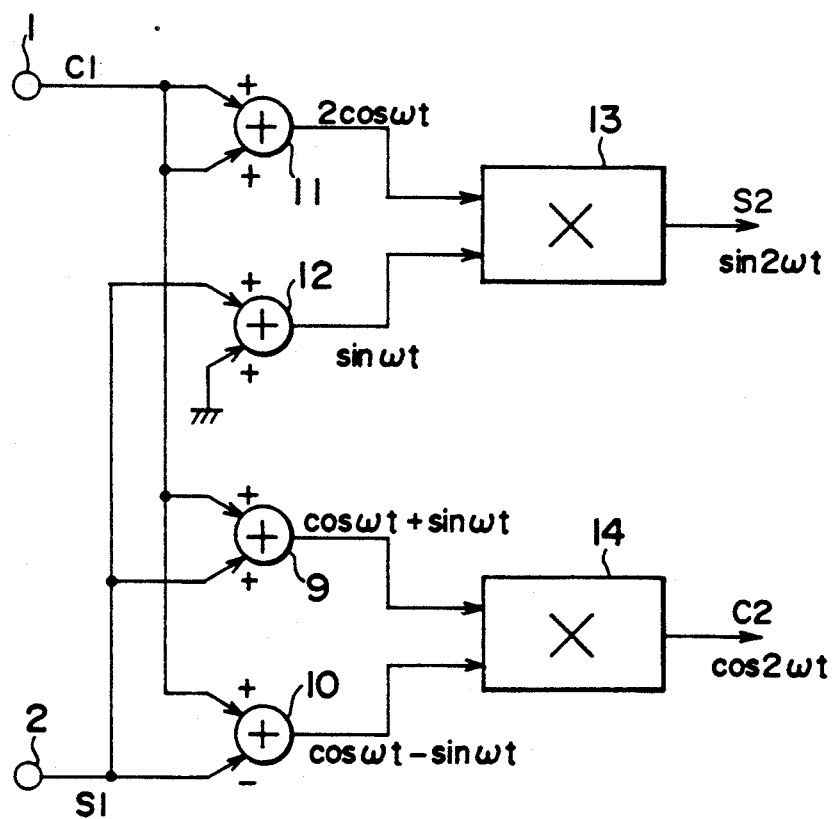
FIG. 2 is a block diagram showing another embodiment of the present invention.

FIG. 2 shows the construction of a specific embodiment of the present invention using the circuit of FIG. 1. Calculation for doubling S2 is accomplished by providing adders 11 and 12 before the multiplier 13, as shown in FIG. 2, and adding signals C1 together and doubling the result thereof. Of course, the system for doubling the level by the addition of the same signals C1 is not restrictive, but an amplifier may be provided to simply amplify the signals to double.

A plurality of such circuits can be connected together and a similar process can be further repeated to thereby obtain two-phase sine wave signals of frequencies power square times as high as 2, such as four times, eight times, sixteen times and so on. That is, according to the present system, to double the resolving power, two multipliers can simply be added and therefore, as compared with the prior-art system, the present system is more advantageous when an attempt is made to obtain particularly high resolving power. Also, multipliers which can accomplish calculation such as (A−B) (C−D) by a single element are commercially available and therefore, such multiplier can be suitably utilized to thereby further suppress the scale of the circuit.

Figure 3:
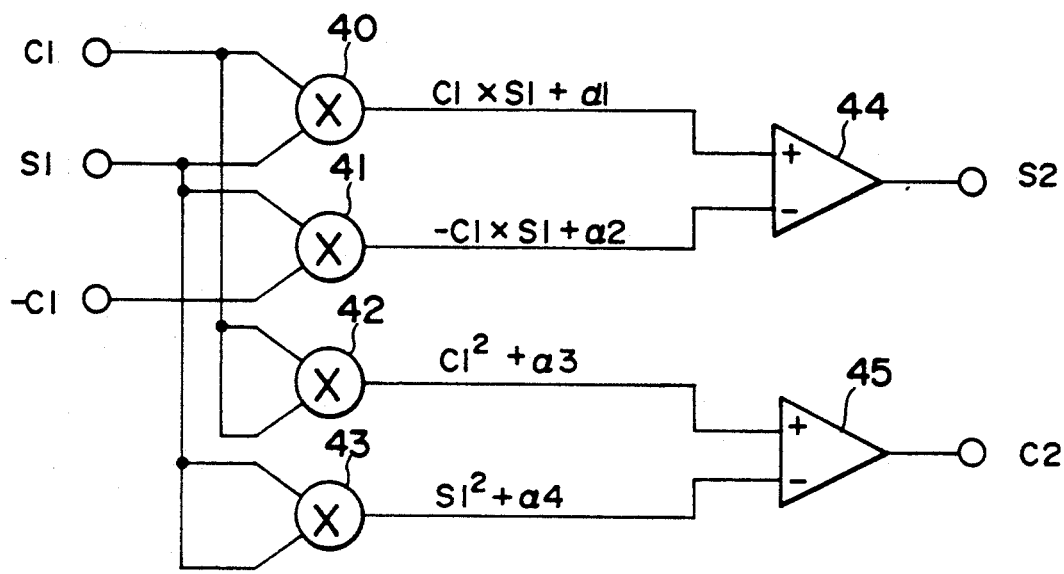
FIG. 3 is a block diagram showing another embodiment of the present invention.

FIG. 3 is a block diagram of an embodiment in which the circuit of FIG. 2 is further improved and the drift of the output by heat can be suppressed. Assuming that signals C1 and S1 obtained from the displacement detecting device and an inverted signal −C1 of C1 are signals of waveforms expressed as $$C1 = \cos\omega t, \; S1 = \sin\omega t, \; -C1 = -\cos\omega t, \quad (1)$$

the outputs of multipliers 40 and 41 are as follows. α1 and α2 are the components of the heat drifts of the multipliers 40 and 41.

$$\sin\omega t \times \cos\omega t + \alpha 1, \; -\sin\omega t \times \cos\omega t + \alpha 2 \quad (2)$$

The output S2 of a differential amplifier 44 is $$S2 = (\sin\omega t \times \cos\omega t + \alpha 1) - (-\sin\omega t \times \cos\omega t + \alpha 2) \quad (3)$$
$$= 2 \times \sin\omega t \times \cos\omega t + \alpha 1 - \alpha 2$$
$$= \sin 2\omega t + \alpha 1 - \alpha 2.$$

On the other hand, assuming that the drifts of multipliers 43 and 43 are α3 and α4, respectively, the outputs of these multipliers are as follows:

$$\sin 2\omega t + \alpha 3, \; \cos 2\omega t + \alpha 4 \quad (4)$$

Consequently, the output C2 of a differential amplifier $$C2 = (\sin^2\omega t + \alpha 3) - (\cos^2\omega t + \alpha 4)$$
$$= \cos^2\omega t + \alpha 3 - \alpha 4.$$

Where at this time, use is made of a multiplier element (for example, AD632) whose output drifts in the + (plus) direction by temperature rise without fail, the drift components of equations (2) and (4 are subjected to a similar variation by a temperature change and therefore, the difference components α1−α2 and α3−α4 of the drift components of equations (3) and (5) are not apt to be subjected to a variation by temperature. Also, where use is made of a multiplier element (for example, AD 634) whose output does not always drift in the + (plus) direction by temperature rise, it is possible to make it difficult to be subjected to a variation by temperature if an element whose temperature characteristic of drift is similar is chosen. Thus, according to the present embodiment, the circuit construction shown in FIG. 3 is adopted and the outputs of the two multipliers are differentially amplified, whereby not only a signal of a frequency twice as high as that of the original signal which is the reference can be obtained, but also the influence of the drift of the analog multiplier can be decreased.

Figure 7:
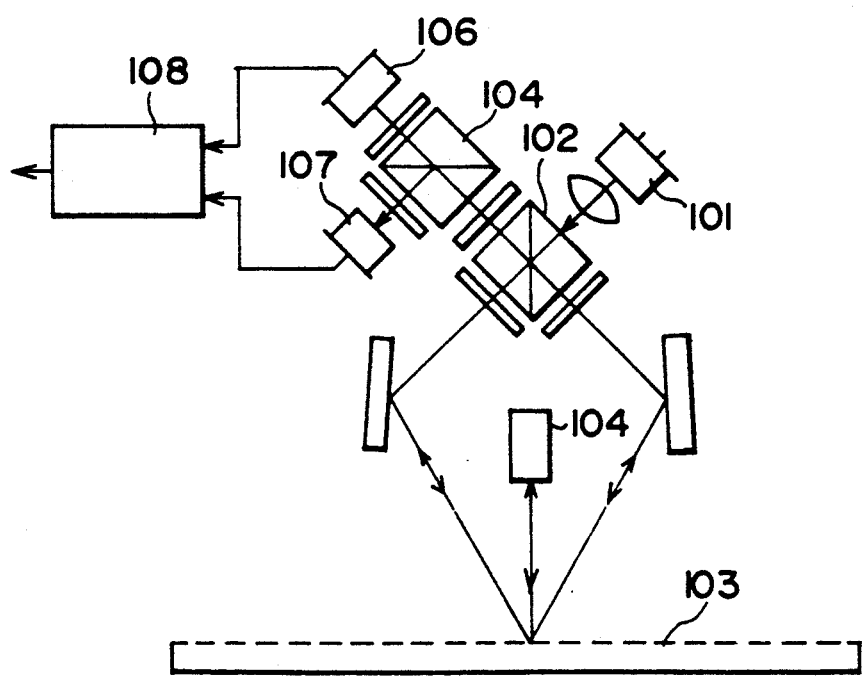
FIG. 7 shows the construction of a displacement measuring apparatus.

Now, the signal processing circuit has been described above, and this signal processing circuit can be used in a device such as a displacement detecting device or a laser length measuring machine. As an example, the construction of a displacement detecting device such as a linear encoder or a rotary encoder having the above-described signal processing circuit is shown in FIG. 7.

A light beam emitted from a coherent light source 101 such as a semiconductor laser is divided into two light beams by a beam splitter 102, and the two light beams are incident on a point on a diffraction grating 103 which is a slit for measuring the amount of movement formed on a movable scale plate or a rotatable disk plate. High-order diffracted lights created from the diffraction grating 103 toward a reflecting optical system 104 by the incidence of the light beams, here, ±1st-order diffracted lights, are both reflected by the reflecting optical system 104 and are again incident on substantially the same position on the diffraction grating 103. The reflecting optical system 104 forms a so-called cat's eye optical system. Here, ±1st-order re-diffracted lights created by the re-incidence return along substantially the same optical path as that during the incidence. Interference lights formed by these ±1st-order re-diffracted lights are made into two-phase perrodic signals having a phase difference of 90° by a polarizing beam splitter 104 and a deflecting plate and are detected by photodetectors 106 and 107, respectively. The sine-shaped and cosine-shaped detection signals provided by these photodetectors 106 and 107, respectively, are made into harmonic signals by a processing circuit 108 having the above-described signal processing circuit to enhance detection resolving power, and the zero cross point of the waveforms of the created signals is detected to thereby obtain divisional pulses, which are output as a detection pulse conforming to the displacement of the diffraction grating. Thus, detection pulses corresponding in number to the amount of displacement (the amount of movement and the amount of rotation) of the diffraction grating relative to the incident light beam are output from the output terminal of the signal processing circuit 108. Further, the direction of rotation and the direction of movement are also detected by the utilization of the phase difference between the two signals.

FIG. 8 shows an example of the use of the above-described- encoder, and shows the system construction of a driving system using the encoder. An encoder unit 111 is connected to the driving output portion of driving means 110 having a drive source such as a motor, an actuator or an internal combustion engine, or to a moving portion for an object to be driven, and detects the driving states such as the amount and speed of rotation or the amount and speed of movement. This encoder unit has the signal processing circuit described above. The detection output from the encoder unit 111 is fed back to control means 112, in which a driving signal is transmitted to the driving means 110 so that there may be brought about a state set by setting means 113. By constructing such a feedback system, it is possible to keep the driving state set by the setting means 113. Such a driving system can be widely applied to a business machine such as a typewriter, a printer, a copying machine or a facsimile apparatus, a video instrument such as a camera or a video recorder, a recording apparatus, a robot, a machine tool, a manufacturing apparatus, and further any apparatus having driving means.

Figure 9:
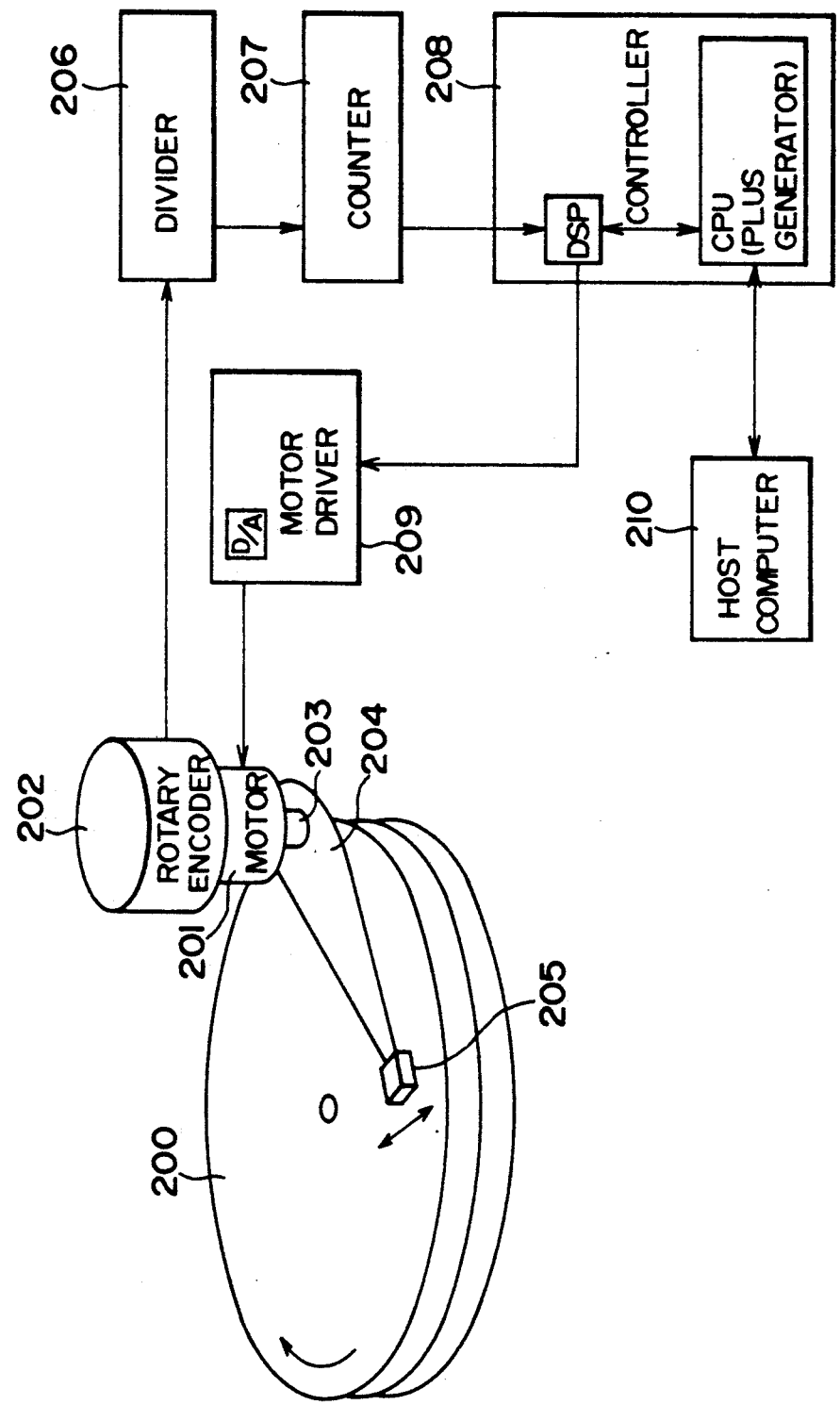
FIG. 9 shows the construction of the servo writer system of a hard disk.

FIG. 9 shows a specific example using such driving system, and shows the general construction of the servo writer system of a hard disk. In FIG. 9, the reference numeral 200 designates the surface of a magnetic disk rotated by driving means, not shown, the reference numeral 201 denotes a motor such as a stepping motor capable of highly accurate rotation, the reference numeral 203 designates the motor shaft of the motor 201, the reference numeral 204 denotes an arm portion directly mounted on the motor shaft 203, and the reference numeral 205 designates a track signal writing head mounted on the tip end of the arm portion 204. With this construction, the writing head 205 is moved on the magnetic disk surface 200 diametrically thereof by the rotation of the motor 201. The reference numeral 202 denotes the rotary encoder described above. The rotary encoder 202 is mounted on the rotary shaft of the motor 201 and detects the amount of rotation of the motor 201.

On the other hand, the reference numeral 206 designates a divider having the above-described signal processing circuit. The divider 206 electrically divides the detection output of the encoder 202 and enhances the detection resolving power. The reference numeral 207 denotes a counter for counting the detection pulses from the divider 206. The reference numeral 208 designates a controller which generally controls the system. The controller 208 has a CPU, a DSP, etc. The reference numeral 209 denotes a motor-driver for driving the motor 201 on the basis of the command of the controller 208. The motor driver 209 has a D/A converter, etc. The reference numeral 210 designates a host computer for setting the operation of the system.

The controller 208 outputs a command to the motor driver 209, on the basis of the detection by the encoder 202 obtained from the counter 207, so that there may be brought about the operation set by the host computer 210, and drives the motor 201 to thereby move the writing head 205 mounted on the tip end of the arm portion 204 on the magnetic disk surface 200 diametrically thereof and shift it accurately to a predetermined track position. On the basis of a signal from a circuit, not shown, a track signal is written onto the magnetic disk surface 200 by the writing head 205.

Embodiment 2

Figure 4:
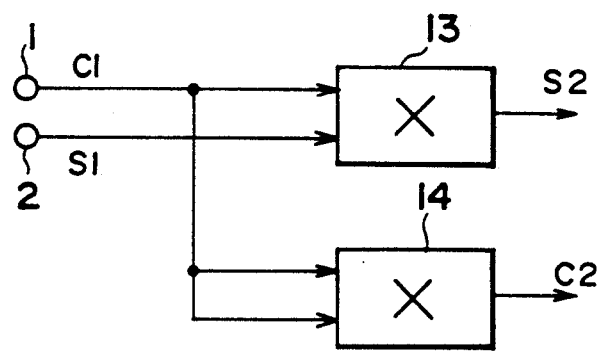
FIG. 4 is a block diagram showing another embodiment of the present invention.

Besides the calculation method by the above-described signal processing circuit, various calculation methods would occur to mind, and an example thereof is shown in FIG. 4. In this figure, S2 is similar to that in FIG. 1 and therefore, C2 alone will hereinafter be described. In FIG. 3, C2 is $$C2 = \sin^2 \omega t = \tfrac{1}{2}(1 - \cos 2\omega t)$$
$$= \tfrac{1}{2} - \tfrac{1}{2} \cos 2\omega t$$

and by removing a DC component 1/2 by the use of an offset adjusting circuit or the like, there can be obtained a cosine wave signal of a frequence twice as high as that of the original reference signal.

Embodiment 3

FIG. 5 shows a third embodiment which is a further development of the above-described embodiment, and in this embodiment, there is obtained a harmonic wave three times as great as the two waves, i.e., the sine wave and the cosine wave. In FIG. 5, the construction comprising adders 21-24 and multipliers 25, 26 is equal to that of the embodiment of FIG. 2, and as previously described, harmonic waves double the reference signal are obtained as the outputs of the multipliers 25 and 26.

When these double harmonic waves and the original sine and cosine waves are combined and multiplied together by adders 27-30, there are obtained the following four signals:

$$\cos 2\omega t \sin \omega t \qquad (1)$$

$$\cos 2\omega t \cos \omega t \qquad (2)$$

$$\sin 2\omega t \cos \omega t \qquad (3)$$

$$\sin 2\omega t \sin \omega t \qquad (4)$$

By the signals (1) and (3) being added together by an adder 31, there is obtained $\sin 3\omega t$, and by the signal (4) being subtracted from the signal (2) by a subtractor 32, there is obtained $\cos 3\omega t$. That is, it will be seen that a harmonic wave three times as great as the input reference signal is obtained.

By further combining similar means together, a signal of a frequency any integer times as high as the frequency of the original signal can be easily obtained the sine wave and the cosine wave.

Embodiment 4

Now, each of the above-described embodiments is based on the premise that the input sine wave signal and cosine wave signal are ideal signals which are accurately coincident with each other in amplitude and have exactly a phase difference of 90° therebetween, but actually, the amplitudes and the phase difference between the sine wave signal and cosine wave signal obtained from the light receiving means are not always ideal and in that case, there axises the problem that interpolation accuracy is reduced.

Figure 11:
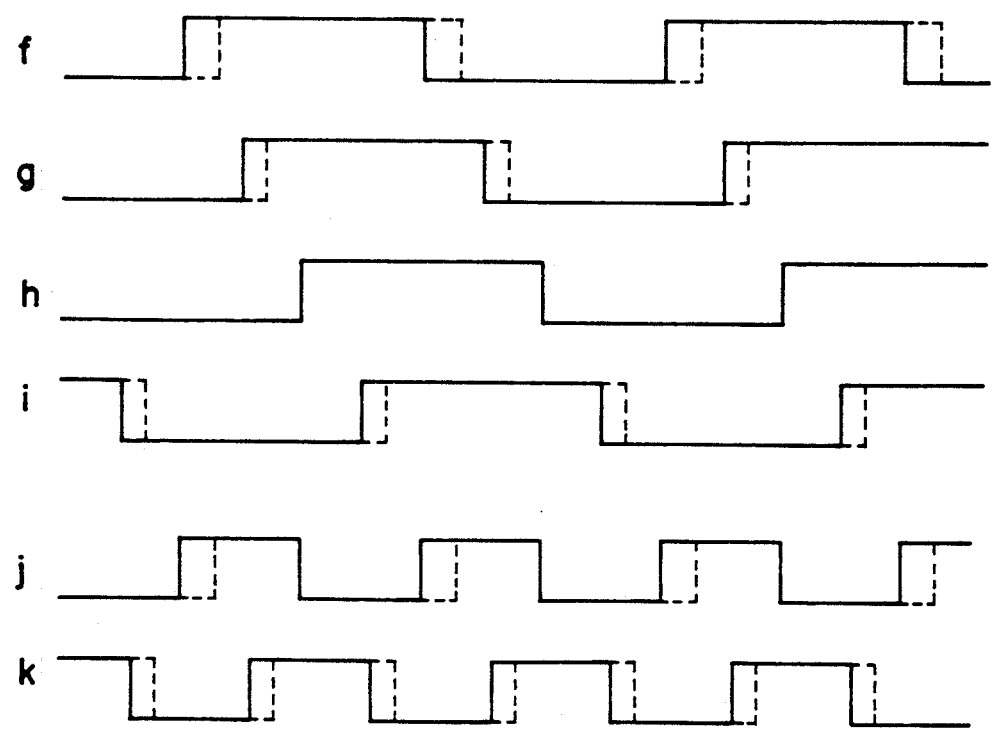
FIG. 11 shows signal waveforms when an unideal signal is input.

FIG. 11 shows the deviation between interpolated signals when

Figure 10:
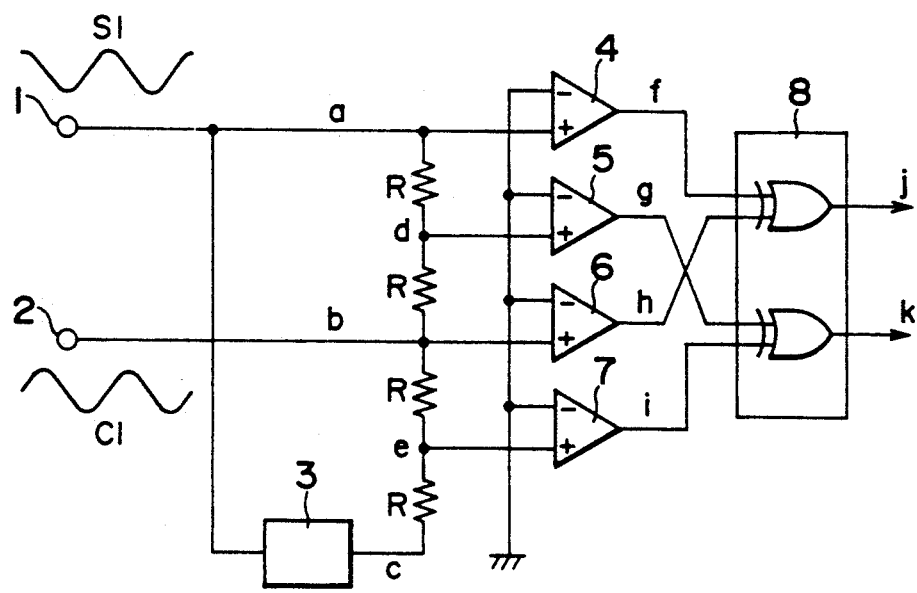
FIG. 10 is a block diagram showing an example of the prior art.

C1 = $A\cos\omega t$ and S1 = $B\sin(\omega t + \phi)$ are input to the terminals 1 and 2, respectively, of the circuit of FIG. 10. Here, A and B represent the amplitudes of the respective signals, and $\phi$ represents the phase difference. In FIG. 11, the solid lines indicate a case where ideal signals are input, and the broken lines indicate a case where said two signals are input, and it will be seen that interpolation accuracy is reduced as indicated by broken lines.

Figure 6:
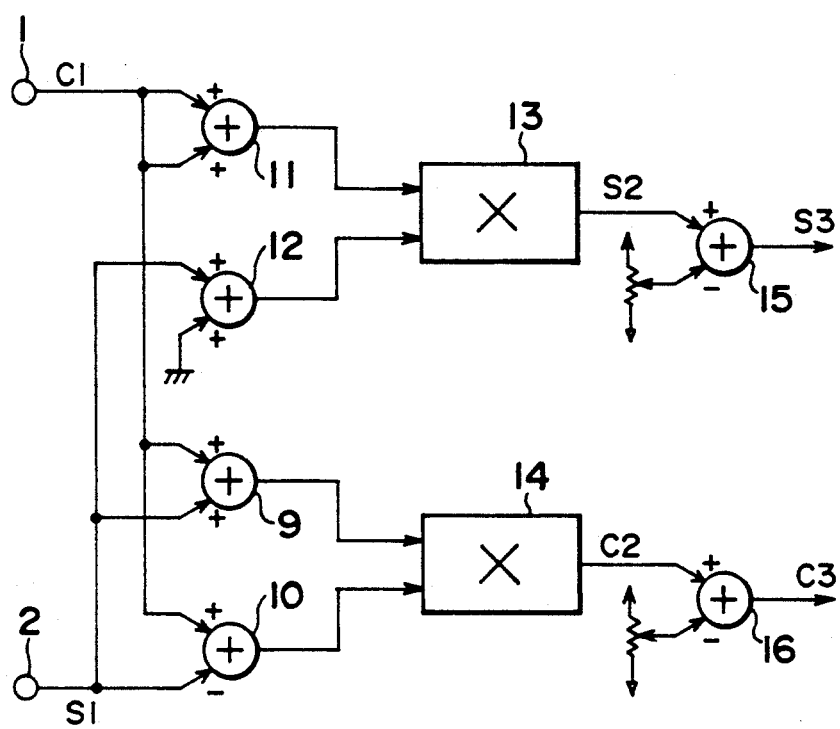
FIG. 6 is a block diagram showing another embodiment of the present invention.

So, the present embodiment intends to solve this problem. FIG. 6 is a block diagram showing the present embodiment, which as an example, is in a form improved on the basis of the FIG. 2 embodiment. In FIG. 6, assuming that two signals C1 and S1 input to input terminals 1 and 2 are signals differing in amplitude from each other as represented by $$C1 = A\cos\omega t, \quad S1 = B\sin\omega t \tag{6}$$

the output S2 of a multiplier 13 obtained is $$\begin{aligned} S2 &= 2AB\sin\omega t \cdot \cos\omega t \\ &= AB\sin 2\omega t. \end{aligned} \tag{7}$$

Also, the output of an adder 9 is ($A\cos\omega t + B\sin\omega t$) and the output of an adder 10 is ($A\cos\omega t - B\sin\omega t$) and therefore, the output C2 of a multiplier 14 is $$\begin{aligned} C2 &= (A\cos\omega t + B\sin\omega t) \times (A\cos\omega t - B\sin\omega t) \\ &= A^2\cos^2\omega t - B^2\sin^2\omega t \\ &= \frac{A^2}{2}(1 + \cos 2\omega t) - \frac{B^2}{2}(1 - \cos 2\omega t) \\ &= \frac{A^2 + B^2}{2}\cos 2\omega t + \frac{A^2 - B^2}{2} \end{aligned} \tag{8}$$

From the output C2 of the multiplier 14, an offset component determined by the amplitude difference between C1 and S1 is removed by offset adjusting means 16 at the subsequent stage, and a signal component C3 represented by the following equation remains alone:

$$C3 = \frac{A^2 + B^2}{2}\cos 2\omega t \tag{9}$$

Here, applying the condition that the maximum value of the amplitude difference is 30% (B=1.3 A) as an example of the output value of a popular displacement detecting device, $$C3 = 1.35\, A^2\cos 2\omega t$$

$$S3 = 1.30\, A^2\sin 2\omega t$$

and it will be seen that the amplitude difference is within 3.8%.

On the other hand, if in FIG. 6, the phase difference between the two input signals S1 and C1 deviates by $\phi$ from ideal, S1 and C1 are expressed as $$S1 = A\sin\omega t, \quad C1 = A\cos(\omega t + \phi) \tag{10}$$

At this time, the outputs S2 and C2 of the multipliers 13 and 14, respectively are:

$$\begin{aligned} S2 &= 2A^2\sin\omega t \cdot \cos(\omega t + \phi) \\ &= A^2\sin(2\omega t + \phi) \end{aligned} \tag{11}$$

$$\begin{aligned} C2 &= \{A\cos(\omega t + \phi) + A\sin\omega t\} \times \\ &\quad \{A\cos(\omega t + \phi) - A\sin\omega t\} \\ &= \frac{A^2}{2}\{\cos(2\omega t + 2\phi) + \cos 2\omega t\} \\ &= A^2\cos(2\omega t + \phi) \cdot \cos\phi \end{aligned} \tag{12}$$

From equations (11) and (12), there is no deviation of the phase difference between S2 and C2, and the amplitude of C2 is ($\cos\phi$) times as great as the amplitude of S2. Assuming that the deviation $\phi$ of the phase difference between S1 and C1 is $\phi = 10°$, $\cos\phi = 0.98$ and therefore, the two signals obtained are signals which are ideal in the other points than that the amplitudes thereof deviate by 2% from each other.

Further, if in FIG. 6, the amplitudes of and the phase difference between the two input signals C1 and S1 both deviate from the ideal waveform, C1 and S1 are expressed as $$C1 = A\cos\omega t, \quad S1 = B\sin(\omega t + \phi)$$

and as the output S2 of the multiplier 13, there is obtained $$\begin{aligned} S2 &= 2AB\sin(\omega t + \phi) \cdot \cos\omega t \\ &= AB\sin(2\omega t + \phi) + AB\sin\phi. \end{aligned}$$

Also, the output of the adder 9 is $\{A\cos\omega t + B\sin(\omega t + \phi)\}$ and the output of the adder 10 is $\{A\cos\omega t - B\sin(\omega t + \phi)\}$ and therefore, the output C2 of the multiplier 14 is:

$$\begin{aligned} C2 &= \{A\cos\omega t + B\sin(\omega t + \phi)\} \times \\ &\quad \{A\cos\omega t - B\sin(\omega t + \phi)\} \\ &= A^2\cos^2\omega t - B^2\sin^2(\omega t + \phi) \\ &= \frac{A^2}{2}(1 + \cos 2\omega t) - \frac{B^2}{2}\{1 - \cos(2\omega t + 2\phi)\} \\ &= \frac{A^2}{2}\{\cos(2\omega t + \phi)\cos\phi + \sin(2\omega t + \phi)\sin\phi\} + \\ &\quad \frac{B^2}{2}\{\cos(2\omega t + \phi)\cos\phi - \sin(2\omega t + \phi)\sin\phi\} + \\ &\quad \frac{A^2 - B^2}{2} \\ &= \frac{A^2 + B^2}{2}\cos(2\omega t + \phi)\cos\phi \\ &= \frac{A^2 - B^2}{2}\sin(2\omega t + \phi)\sin\phi + \frac{A^2 - B^2}{2} \\ &= \frac{A^2 + B^2}{2\delta}\cos(2\omega t + \phi - \xi) + \frac{A^2 - B^2}{2}, \end{aligned}$$

where $$\xi = \tan^{-1}\frac{(A - B)\sin\phi}{(A + B)\cos\phi}$$

$$\delta = \sqrt{\cos^2\phi + \frac{(A - B)^2}{(A + B)^2}\sin^2\phi}\ .$$

From the outputs C2 and S2 of the two multipliers 14 and 13, offset components determined by the phase difference and the amplitude difference between C1 and S1 are removed by the offset adjusting means 16 and 15 at the subsequent stage, and there remain only signal components C3 and S3 represented by the following equations:

$$C3 = \frac{A^2 + B^2}{2\delta}\cos(2\omega t + \phi - \xi)$$

$$S3 = AB\sin(2\omega t + \phi)$$

Here, applying the condition that the amplitude difference is within 20% and the phase difference is within 15° as an example of the output value of a popular displacement detecting device, (B=1.2A, $\phi = 15°$)

$$C3 = 1.22A^2\cos(2\omega t + \phi - 2.34°)$$

$$S3 = 1.2A^2\sin(2\omega t + \phi)$$

and it will be seen that the amplitude difference is within 2% and the phase difference is within 2.34%. By repeating this operation, there can be created signals which are ideal in amplitude difference and phase difference.

In the foregoing, the offset adjusting means are provided at the stage subsequent to the multipliers, but where a DC component is not required as the output, high-pass filters can also be used instead of the offset adjusting means. In such case, the deviation of a variation in phase and a reduction in amplitude in the high frequency areas of individual operational amplifiers for amplifying two input signals is automatically compensated for and therefore, the enlargement of the interpolation errors in the high frequency areas can be mitigated.

As described above, according to the present invention, there can be easily created a sine wave signal and a cosine wave signal having a frequency integer times as high as the frequency of a sine wave signal and a cosine wave signal input by suitably utilizing a calculation process. Also, if this circuit is multiplexly used, there will be provided an apparatus of very high resolving power without the scale of the circuit being made so large.

What is claimed is:

1. A method of monitoring a displacement of an object, comprising the steps of:
   detecting the displacement of the object and producing first sine wave and cosine wave signals corresponding to the displacement of the object;
   effecting a multiplying process for producing second sine wave and cosine wave signals, each having higher frequency that each of the first sine wave and cosine wave signals, and which correspond to the displacement of the object as a result of using the first sine wave and cosine wave signals to produce the second sine and cosine wave signals; and
   producing a signal representing the displacement of the object by using the second sine wave and cosine wave signals.

2. An apparatus for monitoring a displacement of an object, comprising:
   detecting means for detecting the displacement of the object and producing first sine wave and cosine wave signals corresponding to the displacement of the object; and
   signal producing means for producing a signal representing the displacement of the object in response to the first sine wave and cosine wave signals, said signal producing means effecting a multiplying process for producing second sine wave and cosine wave signals, each having a higher frequency than each of the first sine wave and cosine wave signals, respectively, and corresponding to the displacement of the object as a result of use of the first sine wave and cosine wave signals to produce the second sine and cosine wave signals.

3. A signal processing apparatus according to claim 2, further having compensation means for compensating for an error component by any deviation which may be present in the amplitude of and/or the phase difference between the sine wave and cosine wave signals which are the references.

4. A displacement detecting device comprising:
   detecting means for detecting displacement of the object and producing first sine wave and cosine wave signals corresponding to the displacement of the object; and
   signal producing means for producing a signal representing the displacement of the object in response to the first sine wave and cosine wave signals, said signal producing means including a first multiplier for effecting a multiplying process for producing a second sine wave signal having higher frequency than that of the first sine wave signal and corresponding to the displacement of the object, by using the first sine wave and cosine wave signals, and a second multiplier for effecting a multiplying process for producing a second cosine wave signal having higher frequency than that of the first cosine wave signal and corresponding to the displacement of the object, by using at least the first sine wave signal,
   wherein the signal representing the displacement of the object is produced by using the second sine wave and cosine wave signals.

5. A displacement detecting device according to claim 4, further having compensation means for compensating for an error component by any deviation which may be present in the amplitude of and/or the phase difference between said sine wave and cosine wave signals which are the references.

6. A displacement detecting device according to claim 4, wherein said detecting means has an encoder.

7. A displacement detecting device according to claim 4, wherein said detecting means has means for optically detecting the displaced state.

8. A displacement detecting device according to claim 7, wherein said detecting means has means for detecting the displaced state by the utilization of light interference.

9. A driving system comprising:
   driving means for driving an object;
   detecting means for detecting a displacement of the object and producing first sine wave and cosine wave signals corresponding to the displacement of the object; and
   signal producing means for producing a signal representing the displacement of the object in response to the first sine wave and cosine wave signals, said signal producing means including a first multiplier for effecting a multiplying process for producing a second sine wave signal having higher frequency than that of the first sine wave signal and corresponding to the displacement of the object, by using the first sine wave and cosine wave signals, and a second multiplier for effecting a multiplying process for producing a second cosine wave signal having higher frequency than that of the first cosine wave signal and corresponding to the displacement of the object, by using at least the first sine wave signal,
   wherein the signal representing the displacement of the object is produced by using the second sine wave and cosine wave signals, and
   wherein said drive means drives the object in accordance with the signal representing the displacement of the object.

10. A driving system according to claim 9, further having compensation means for compensating for an error component by any deviation which may be present in the amplitudes of and/or the phase difference between said sine wave and cosine wave signals which are the references.

11. A driving system according to claim 9, wherein said detecting means has an encoder.

12. A method of monitoring a displacement of an object, comprising the steps of:
- detecting the displacement of the object and producing first sine wave and cosine wave signals corresponding to the displacement of the object; and
- effecting a multiplying process to produce second sine wave and cosine wave signals, each having a higher frequency than each of the first sine wave and cosine wave signals, and corresponding to the displacement of the object by using the first sine wave and cosine wave signals,
- wherein the displacement of the object is represented by means of the second sine wave and cosine wave signals.

13. An apparatus for detecting a displacement of an object, comprising:
- detecting means for detecting the displacement of the object and producing first sine wave and cosine wave signals corresponding to the displacement of the object; and
- signal producing means for producing a signal representing the displacement of the object in response to the first sine wave an cosine wave signals, said signal producing means effecting a multiplying process for producing second sine wave and cosine wave signals, each having a higher frequency than each of the first sine wave and cosine wave signals, and corresponding to the displacement of the object, by using the first sine wave and cosine wave signals,
- wherein the signal representing the displacement of the object is produced by using the second sine wave and cosine wave signals.

14. A driving system for driving an object, comprising:
- driving means for driving an object;
- detecting means for detecting a displacement of the object and producing first sine wave and cosine wave signals corresponding to the displacement of the object; and
- signal producing means for producing a signal representing the displacement of the object in response to the first sine wave and cosine wave signals, said signal producing means including a first multiplier for effecting a multiplying process for producing a second sine wave signal having higher frequency than that of the first sine wave signal and corresponding to the displacement of the object, by using the first sine wave and cosine wave signals, and a second multiplier for effecting a multiplying process for producing a second cosine wave signal having a higher frequency than that of the first cosine wave signal and corresponding to the displacement of the object, by using at least the first sine wave signal,
- wherein the signal representing the displacement of the object is produced by using the second sine wave and cosine wave signals, and
- wherein said drive means drives the object in accordance with the signal representing the displacement.

15. A method of monitoring a displacement of an object, comprising the steps of:
- detecting the displacement of the object and producing a first and second sine-like wave signals, having a phase difference with each other and corresponding to the displacement of the object;
- effecting a multiplying process by using the first and second sine wave-like signals to produce third and fourth sine wave-like signals, each having a higher frequency than each of the first and second sine wave-like signals and having a phase difference with each other and corresponding to the displacement of the object; and
- determining the displacement of the object from the third and fourth sine wave-like signals.

16. A method for monitoring a displacement of an object, comprising the steps of:
- detecting the displacement of the object and producing a first sine-like wave signal corresponding to the displacement of the object;
- effecting a multiplying process by using the first sine-like wave signal to produce a second sine-like wave signal having higher frequency than that of the first sine-like wave signal and corresponding to the displacement of the object; and
- determining the displacement of the object from the second sine-like wave signal.

* * * * *

UNITED STATES PATENT AND TRADEMARK OFFICE
CERTIFICATE OF CORRECTION

PATENT NO. : 5,235,406
DATED : August 10, 1993
INVENTOR(S) : SATOSHI ISHII ET AL.

It is certified that error appears in the above-identified patent and that said Letters Patent is hereby corrected as shown below:

COLUMN 3

Line 10, "that" should read --and--.
      Line 59, "43 and 43" should read --42 and 43--.
      Line 63, "amplifier" should read --amplifier 45 is--.

COLUMN 4

Line 4, "(4are" should read --(4) are--.
      Line 46, "perrodic" should read --periodic--.
      Line 68, "described-encoder," should read
           --described encoder,--.

COLUMN 6

Line 44, "obtained" should read --obtained from--.
      Line 56, "axises" should read --arises--.

UNITED STATES PATENT AND TRADEMARK OFFICE
CERTIFICATE OF CORRECTION

PATENT NO. : 5,235,406
DATED : August 10, 1993
INVENTOR(S) : SATOSHI ISHII ET AL.

It is certified that error appears in the above-identified patent and that said Letters Patent is hereby corrected as shown below:

COLUMN 11

Line 27, "an" should read --and--.

Signed and Sealed this

Seventeenth Day of May, 1994

BRUCE LEHMAN

Attest:

Attesting Officer

Commissioner of Patents and Trademarks